US011975946B2

(12) United States Patent
Watabe et al.

(10) Patent No.: US 11,975,946 B2
(45) Date of Patent: May 7, 2024

(54) ELEVATOR ROPE MONITORING DEVICE AND ELEVATOR ROPE MONITORING METHOD

(71) Applicants: Meidensha Corporation, Tokyo (JP); Otis Elevator Company, Farmington, CT (US)

(72) Inventors: Yusuke Watabe, Tokyo (JP); Makoto Niwakawa, Tokyo (JP); Mitsuru Kato, Inzai (JP); Ryuji Onoda, Chiba (JP); Hirotomo Tanaka, Chiba (JP); Takashi Takeuchi, Tokyo (JP)

(73) Assignees: MEIDENSHA CORPORATION, Tokyo (JP); OTIS ELEVATOR COMPANY, Farmington, CT (US)

( * ) Notice: Subject to any disclaimer, the term of this patent is extended or adjusted under 35 U.S.C. 154(b) by 1379 days.

(21) Appl. No.: 16/465,007

(22) PCT Filed: Nov. 29, 2017

(86) PCT No.: PCT/JP2017/042732
§ 371 (c)(1),
(2) Date: May 29, 2019

(87) PCT Pub. No.: WO2018/101296
PCT Pub. Date: Jun. 7, 2018

(65) Prior Publication Data

US 2019/0322489 A1 Oct. 24, 2019

(30) Foreign Application Priority Data

Nov. 29, 2016 (JP) ................................ 2016-230837

(51) Int. Cl.
*B66B 7/12* (2006.01)
*B66B 5/00* (2006.01)
*B66B 5/02* (2006.01)

(52) U.S. Cl.
CPC .......... *B66B 7/1238* (2013.01); *B66B 5/0031* (2013.01); *B66B 5/02* (2013.01)

(58) Field of Classification Search
CPC ........ B66B 7/1238; B66B 5/0031; B66B 5/02
See application file for complete search history.

(56) References Cited

U.S. PATENT DOCUMENTS

2012/0294506 A1 11/2012 Verreet

FOREIGN PATENT DOCUMENTS

EP 3617123 A1 * 3/2020 .............. B66B 3/00
JP 2009057126 A 3/2009

(Continued)

OTHER PUBLICATIONS

International Search Report and Written Opinion for application PCT/JP2017/042732, dated Mar. 5, 2018, 11 pages.

(Continued)

*Primary Examiner* — Jeffrey Donels
(74) *Attorney, Agent, or Firm* — CANTOR COLBURN LLP

(57) ABSTRACT

An elevator rope monitoring device, provided with: line sensor cameras 1*a*, 1*b* for imaging the entire circumference of the traveling elevator rope 5; a speed/position detecting device 4 for detecting the traveling speed and traveling position of the elevator rope 5; an image recording part 3*a* for inputting the image acquired by the line sensor cameras 1*a*, 1*b* in association with the traveling position of the elevator rope 5 detected by the speed/position detecting means 4; an image creating part 3*b* for creating an entire circumferential image of the elevator rope 5 from the image imaged by the line sensor cameras 1*a*, 1*b*; and an image processing part 3*c* for detecting an abnormality in the elevator rope 5 by analyzing the entire circumferential image.

6 Claims, 6 Drawing Sheets

(56) References Cited

FOREIGN PATENT DOCUMENTS

| | | | | | |
|---|---|---|---|---|---|
| JP | 2011011870 | A | | 1/2011 | |
| JP | 2012008026 | A | | 1/2012 | |
| JP | 5413096 | B2 | | 2/2014 | |
| JP | 5413148 | B2 | | 2/2014 | |
| JP | 5428798 | B2 | | 2/2014 | |
| JP | 5446849 | B2 | | 3/2014 | |
| WO | 2010092619 | A1 | | 8/2010 | |
| WO | WO-2021032903 | A1 | * | 2/2021 | ........... B66B 7/1238 |

OTHER PUBLICATIONS

Japanese Decision to Grant a Patent for Application No. 2016-230837, dated Dec. 15, 2020, 2 Pages.

* cited by examiner

ELEVATOR ROPE MONITORING DEVICE AND ELEVATOR ROPE MONITORING METHOD

TECHNICAL FIELD

The present invention relates to an elevator rope monitoring device and an elevator rope monitoring method.

BACKGROUND ART

Conventionally, a rope tester for inspecting using a magnetic force line is known as a device for inspecting an elevator rope. However, when using a magnetic force line, it is necessary to keep the distance between the elevator rope and the sensor a constant distance, and it is necessary to fix the position other than the progressing direction of the elevator rope using a rope guide or the like. That is, for contact-type there is a problem that when a wire (strand) configuring the elevator rope breaks and jumps out from the elevator rope surface, measurement of the elevator rope cannot be carried out. Furthermore, since it is operated at a low speed, it was impossible to inspect while carrying out a normal operation.

In order to solve such a problem, a non-contact type inspection device using a camera has been proposed. For example, patent literature 1 below discloses a device for imaging an elevator rope using a camera provided on an elevator car, and determining the deterioration of the elevator rope when the outer diameter of the elevator rope deviates from a reference value.

Furthermore, patent literature 2 discloses a technique for imaging a wire rope for an elevator using an ITV device every time the elevator travels one frame, and determining if it is necessary to replace the rope when detected that there is a predetermined number of a predetermined size or a predetermined length of abrasion feet on a wire within a predetermined range of the image signal, or when detected that there is a predetermined number of wire breaks within a predetermined range.

CITATION LIST

Patent Literature

PTL 1: Japanese Unexamined Patent Application Publication No. 2014-88261

PTL 2: Japanese Unexamined Patent Application Publication No. 2009-12903

SUMMARY OF INVENTION

Technical Problem

However, the inspection device disclosed in the patent literature 1 has a problem in that it is necessary to install a camera on the elevator car, and only one side of the elevator rope can be measured due to the configuration of the device.

Furthermore, the inspection device disclosed in the patent literature 2 has a problem in that when the elevator moves one frame, the shutter of the ITV device is released and the image is saved, but depending on the timing at which the shutter is released, the imaging range of the area sensor, and on the distance between the ITV device and the rope at the time of installation, the lens, and the like, it is difficult to adjust to image the entire length of the rope without gaps.

Thus, an object of the present invention is to provide an elevator rope monitoring device and an elevator rope monitoring method where it is easy to install and adjust the camera, and that can monitor the elevator rope by acquiring once an entire circumferential image of the elevator rope.

Solution to Problem

In order to solve the aforementioned problems, the elevator rope monitoring device according to a first invention is provided with: imaging means for imaging the entire circumference of the traveling elevator rope; speed/position detecting means for detecting the traveling speed and traveling position of the elevator rope; image recording means for inputting the image acquired by the recording means in association with the traveling position of the elevator rope detected by the speed/position detecting means; image creating means for creating an entire circumferential image of the elevator rope from the image; and image processing means for detecting an abnormality in the elevator rope by analyzing the entire circumferential image.

Furthermore, in order to solve the aforementioned problems, the elevator rope monitoring device according to a second invention, wherein the imaging means is a plurality of line sensor cameras; the plurality of line sensor cameras are all synchronized with each other, and mutually image the entire circumference of the elevator rope by imaging different positions in the circumferential direction of the elevator rope; and the image creating means creates an entire circumferential image from the image imaged by all the line sensor cameras.

Furthermore, in order to solve the aforementioned problems, the elevator rope monitoring device according to a third invention is provided with: a mirror that reflects the elevator rope; wherein the imaging means is a single line sensor camera; the line sensor camera images the entire circumference of the elevator rope by simultaneously imaging the elevator rope and the mirror image of the elevator rope reflected by the mirror; and the image creating means corrects an image portion of the minor image of the elevator rope imaged by the line sensor camera, and creates the entire circumferential image by synthesizing the corrected image of the minor image of the elevator rope and the image of the elevator rope.

Furthermore, in order to solve the aforementioned problems, the elevator rope monitoring method according to a fourth invention is provided with the steps of: detecting the traveling speed and traveling position of an elevator rope using a speed/position detecting means, while imaging the entire circumference of the traveling elevator rope using an imaging means; inputting an image acquired by the imaging means using an image recording means in association with the traveling position of the elevator rope detected by the speed/position detecting means; creating an entire circumferential image of the elevator rope from the image using an image creating means; detecting an abnormality in the elevator rope by analyzing the entire circumferential image using an image processing means.

Furthermore, in order to solve the aforementioned problems, the elevator rope monitoring method according to a fifth invention, wherein the imaging means is a plurality of line sensor cameras; the plurality of line sensor cameras are all synchronized with each other, and mutually image the entire circumference of the elevator rope by imaging different positions in the circumferential direction of the elevator rope; and the image creating means creates an entire circumferential image from the image imaged by all the line sensor cameras.

Furthermore, in order to solve the aforementioned problems, the elevator rope monitoring method according to a sixth invention, wherein the imaging means is a single line sensor camera; a mirror is provided for reflecting the elevator rope; the line sensor camera images the entire circumference of the elevator rope by simultaneously imaging the elevator rope and the mirror image of the elevator rope reflected by the mirror; and the image creating means corrects an image portion of the minor image of the elevator rope imaged by the line sensor camera, and creates the entire circumferential image by synthesizing the corrected image of the minor image of the elevator rope and the image of the elevator rope.

Advantageous Effects of Invention

According to the elevator rope monitoring device according to the present invention, it is easy to install and adjust the camera, and it is possible to monitor an elevator rope by acquiring once the entire circumference of the elevator rope.

BRIEF DESCRIPTION OF DRAWINGS

FIG. 3(*b*) is an explanatory view illustrating an example of a template of a normal pattern.

DESCRIPTION OF EMBODIMENTS

The elevator rope monitoring device and the elevator rope monitoring method according to the present invention will be described below with reference to the drawings. The elevator rope monitoring device and the elevator rope monitoring method according to the present invention has installed a line sensor camera around the hoisting machine of the elevator rope, and monitors the state of the imaged rope by image processing data acquired by the line sensor camera.

In the elevator rope monitoring device and the elevator rope monitoring method, for example, the entire circumferential of the elevator rope is inspected in a noncontact manner at once by aligning the imaging lines of the plurality of the line sensor camera disposed in the circumferential direction of the rope, or using a mirror and the like.

The details of the elevator rope monitoring device and the elevator rope monitoring method according to the first embodiment of the present invention will be described using FIG. 1 to FIG. 3.

Figure 1:
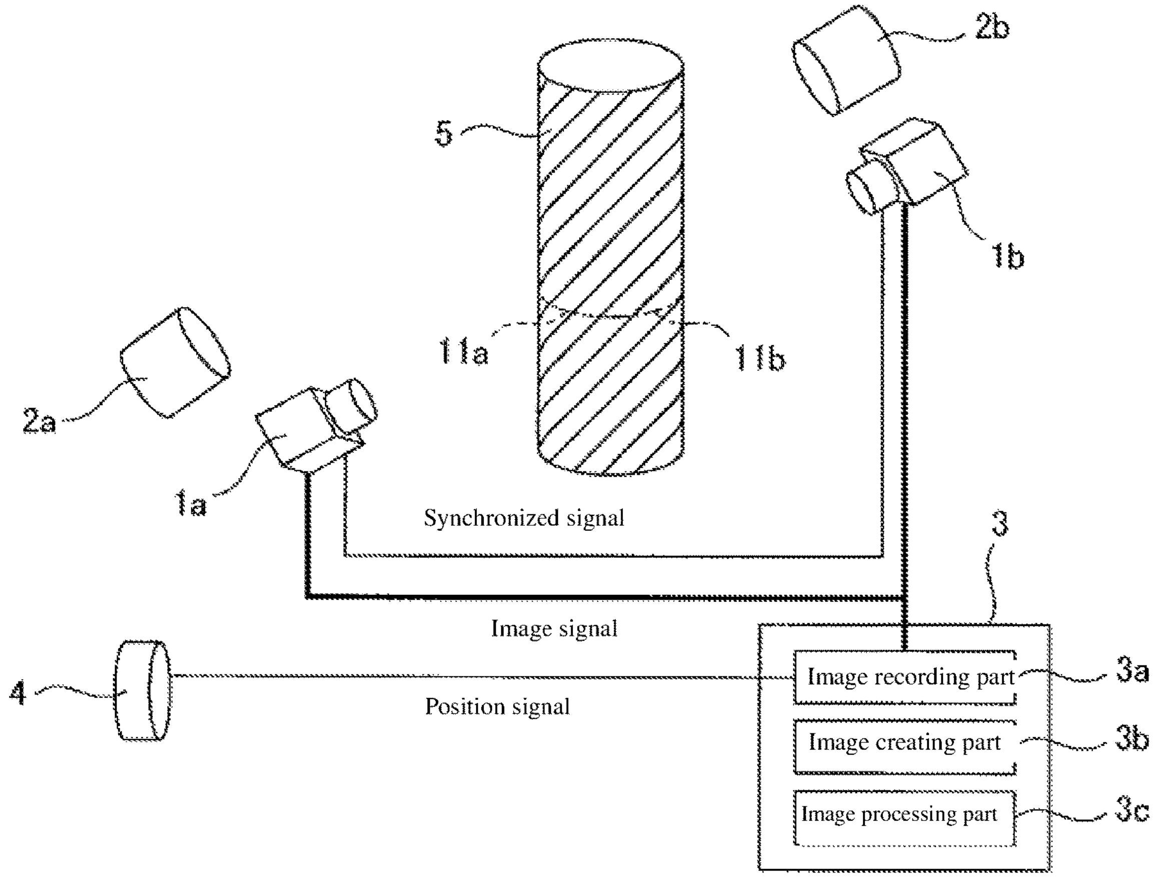
FIG. 1 is a configuration diagram schematically illustrating the elevator rope monitoring device according to a first embodiment of the present invention.

As illustrated in FIG. 1, the elevator rope monitoring device according to the present embodiment is provided with a plurality (two in FIG. 1) of a line sensor camera 1*a*, 1*b* as imaging means, a plurality (two in FIG. 1) of a lighting device 2*a*, 2*b*, a rope diagnosis device 3, and a speed/position detecting device 4 as a speed/position detecting means.

The line sensor cameras 1*a*, 1*b* are synchronized with each other, are installed so that the respective scanning direction are orthogonal to the traveling direction of the elevator rope 5 and the respective imaging lines are at the same position in the traveling direction of the elevator rope 5, and are disposed so as to be able to image the entire circumference in the circumferential direction of the elevator rope 5 using the line sensor cameras 1*a*, 1*b*. Note that 11*a* illustrated in FIG. 1 illustrates an imaging line imaged by the line sensor camera 1*a*, and 11*b* illustrates an imaging line imaged by the line sensor camera 1*b*.

Furthermore, the line sensor cameras 1*a*, 1*b* are set so as to image while automatically changing the sampling frequency according to the traveling speed (position) of the elevator rope 5 based on the information from the speed/position detecting device 4.

The lighting devices 2*a*, 2*b* are installed near the line sensor cameras 1*a*, 1*b*, respectively, and light a portion imaged by the line sensor cameras 1*a*, 1*b* of the elevator rope 5.

These line sensor cameras 1*a*, 1*b* and the lighting devices 2*a*, 2*b*, for example, are installed around the hoisting machine of the elevator rope 5.

The rope diagnosis device 3 inspects the state of the elevator rope 5 based on image data of the elevator rope 5 images by the line sensor cameras 1*a*, 1*b*; and is provided with an image recording part 3*a* as the image recording means, an image creating part 3*b* as the image creating means, and an image processing part 3*c* as the image processing means.

The image recording part 3*a* inputs image data from all the line sensor cameras 1*a*, 1*b*, and records this in association with the position information acquired from the speed/position detecting device 4.

Figure 3:
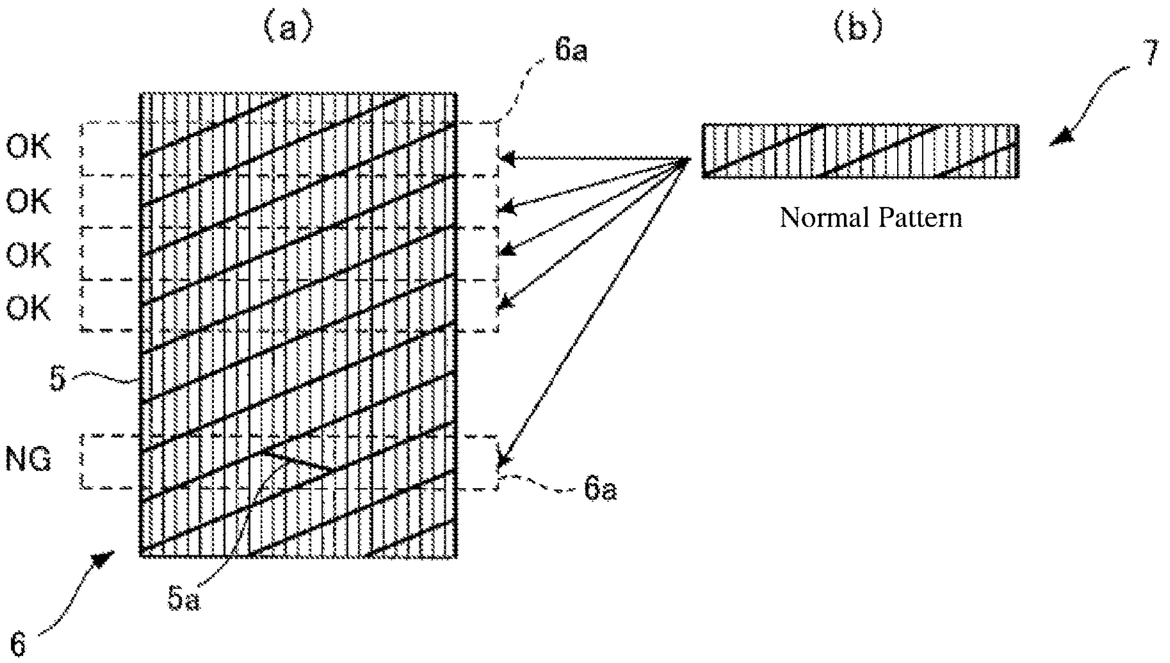
FIG. 3(*a*) is an explanatory view illustrating an example of setting an inspection range for an entire circumference image of the rope.

The image creating device 3*b* creates an entire circumferential image 6 (see FIG. 3(*a*)) for each elevator rope 5 based on image data acquired from all the line sensor cameras 1*a*, 1*b*.

The image processing part 3*c* analyzes the entire circumferential image 6, and extracts wire breakage, strand breakage, and the like.

The speed/position detecting device 4 acquires position information of the elevator rope 5, and, for example, is an encoder or the like for detecting rotation of the motor of the elevator hoisting machine, not illustrated. The position information acquired by the speed/position detecting device 4 is synchronized with the image data images by the line sensor cameras 1*a*, 1*b*.

Next, the flow of the rope diagnosis according to the rope diagnosis device 3 of the present embodiment will be described using FIG. 2 and FIG. 3.

Figure 2:
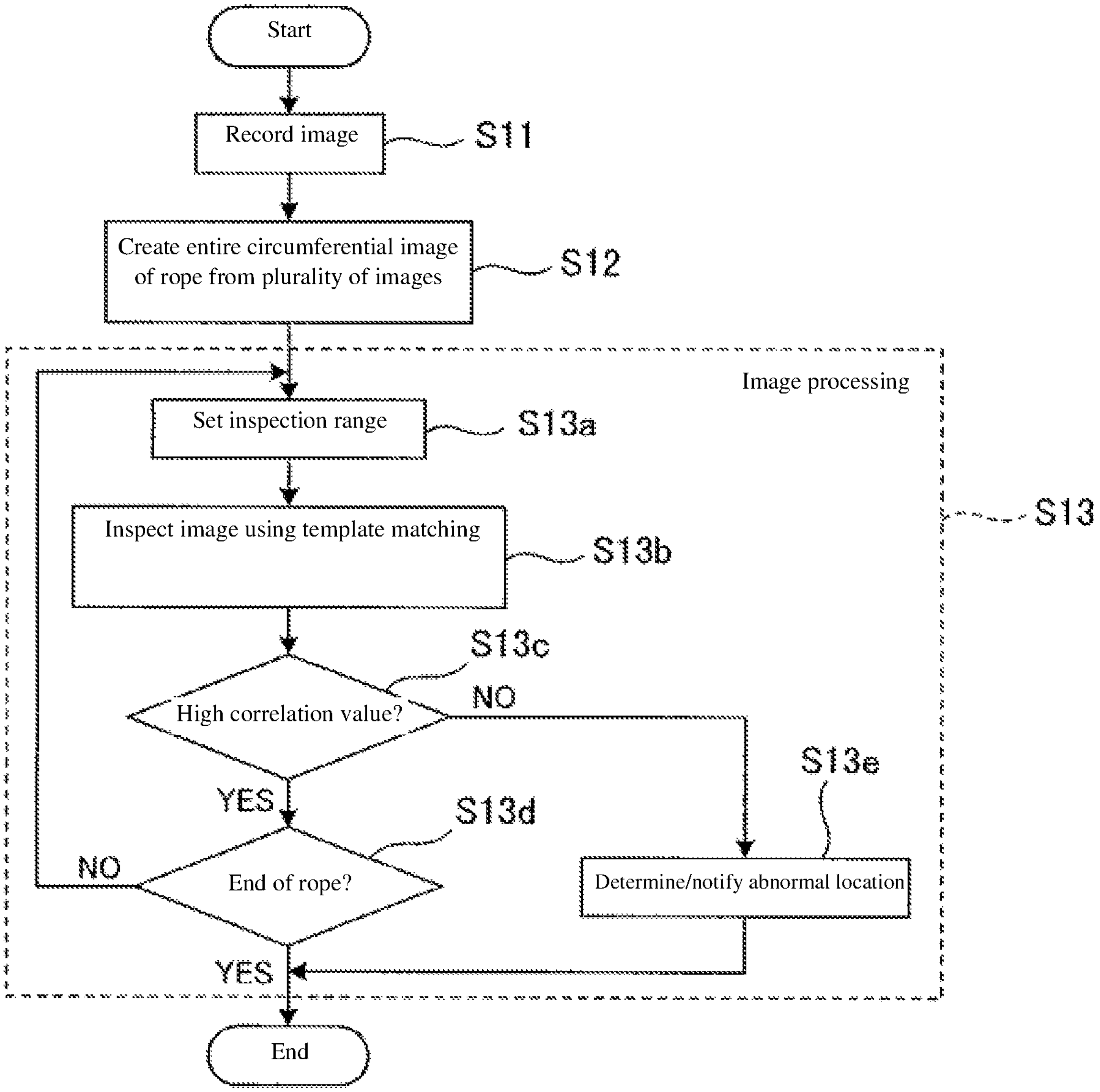
FIG. 2 is a flowchart illustrating the flow of the rope diagnosis processing according to the rope diagnosis device illustrated in FIG. 1.

As illustrated in FIG. 2, the rope diagnosis device 3 first records the image of the elevator rope 5 imaged by all the line sensor cameras 1*a*, 1*b* in association with the position information acquired from the speed/position detecting device 4 using the image recording part 3*a* (step S11), then creates the entire circumferential image 6 of the elevator rope 5 by synthesizing the images imaged by the line sensor cameras 1*a*, 1*b* for each of the same imaging times using the image creating part 3*b* (step S12).

Thereafter, image processing of the entire circumferential image 6 of the elevator rope 5 is carried out by the image processing part 3*c* (step S13).

Specifically, first, as illustrated in FIG. 3(*a*), the inspection range 6*a* is set for the entire circumferential image 6 (step S13*a*). The inspection range 6*a* is set as the range corresponding to a normal pattern template 7 created by acquiring the image of a normal elevator rope 5 in advance, as illustrated in FIG. 3(*b*).

Following step S13*a,* image inspection is carried out using template matching for comparing the image within the inspection range 6*a* and the normal pattern template 7 (step S13*b*).

Subsequently, it is determined whether a correlation value between the image within the inspection range 6*a* and the normal pattern template 7 is higher than a preset threshold value (step S13*c*); when the correlation value is higher than the threshold value (YES), the range is determined to be not abnormal (OK), and transitions to step S13*d.* Meanwhile, in step S13*c,* when the correlation value is lower than the threshold value (NO), since it is different than the normal pattern, it is determined that there is a potential for wire breakage or strand breakage (NG), and transitions to step S13*e.*

In step S13*d,* it is determined whether inspection has been performed to the end of the elevator rope 5, and if the inspection has not been performed to the end of the elevator rope 5 (NO), it returns to step S13*a,* but if the inspection has been performed to the end of the elevator rope 5 (YES), the diagnosis processing of the elevator rope 5 is completed.

Furthermore, in step S13*e,* it is determined that there is an abnormal location, the existence of the abnormal location and its position are notified, and the diagnosis processing is completed. Note that in FIG. 3(*a*), an example in which a strand break 5*a* has occurred is illustrated.

According to the elevator rope monitoring device according to the present embodiment configured as such, the entire circumferential of the elevator rope 5 is acquired at once by a plurality of a line sensor camera 1*a,* 1*b* synchronized with each other, and monitoring of the elevator rope 5 can be carried out. In addition, since the position information is input from the speed/position detecting device 4, which is an external device, and is imaged while automatically changing the sampling frequency of the line sensor camera 1*a,* 1*b* according to the traveling speed (position) of the elevator rope 5, it is no longer necessary to take into consideration the imaging range of the scanning direction compared to when imaging using an area camera as in a conventional case, and it is possible to carry out monitoring of the elevator rope 5 without depending on the distance between the camera and the rope when installing the line sensor cameras 1*a,* 1*b,* or the lens.

That is, when using a conventional area camera, it is not necessary to adjust the timing for releasing the shutter according to the imaging range in the traveling direction, and since the imaging timing depends on the distance between the camera and the rope when installing the area camera, or the lens, it is difficult to adjust so as to image the entire length of the rope without gaps, but in the present embodiment, by using the line sensor cameras 1*a,* 1*b,* and inputting the position information from the outside (in the present embodiment, the speed/position detecting device 4), since it can image while automatically changing the sampling frequency of the line sensor camera 1*a,* 1*b* according to the traveling speed (position) of the elevator rope 5, installation and adjustment of the elevator rope monitoring device is easy.

Furthermore, by using the position information acquired from the speed/position detecting device 4, since the position of the elevator rope 5 on the image imaged using the line sensor cameras 1*a,* 1*b* is linked with the actual position information of the elevator rope 5, it is possible to easily identify an abnormal location when detecting an abnormality.

The elevator rope monitoring device and the elevator rope monitoring method according to the second embodiment of the present invention will be described in detail below using FIG. 4 and FIG. 5.

Figure 4:
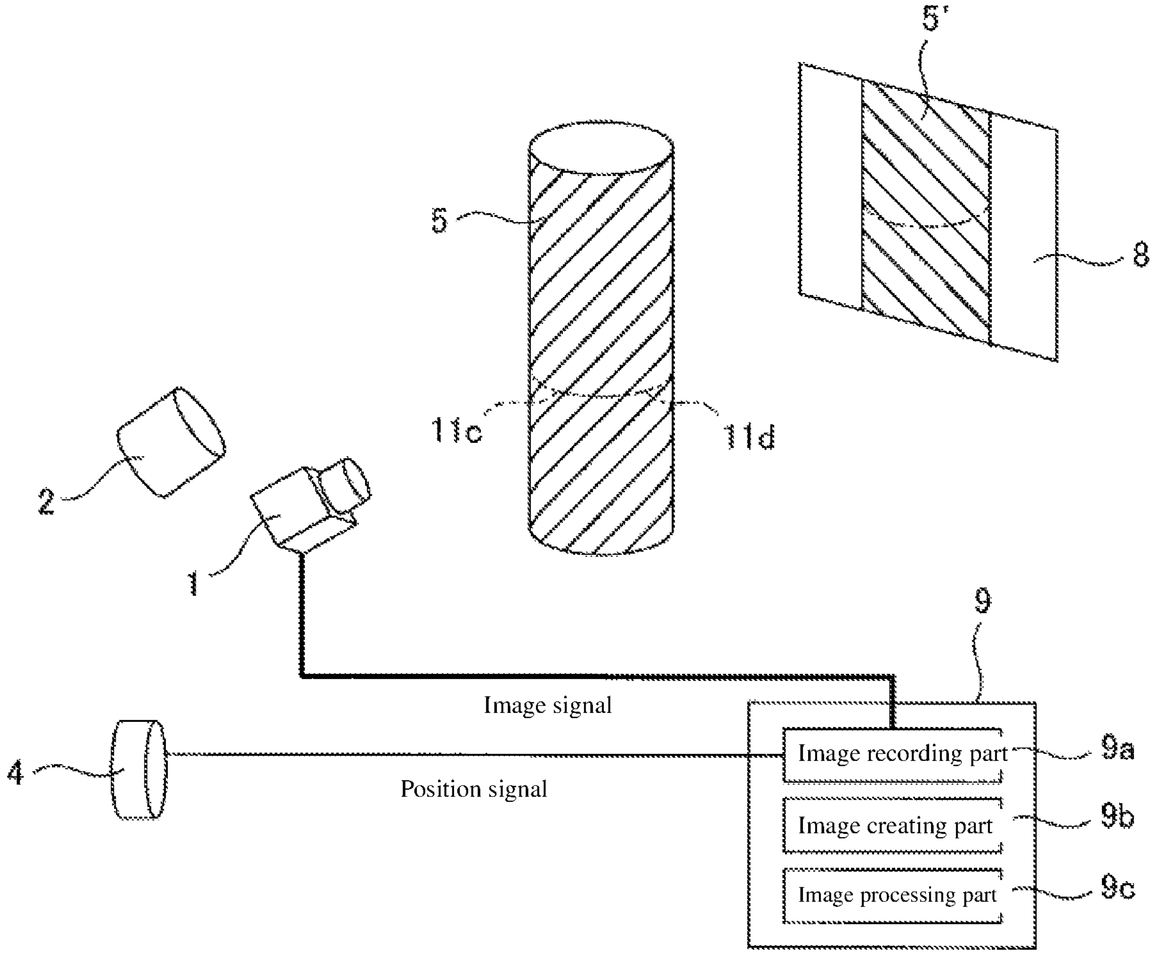
FIG. 4 is a configuration diagram schematically illustrating the elevator rope monitoring device according to a second embodiment of the present invention.

As illustrated in FIG. 4, the elevator rope monitoring device according to the present embodiment, is provided with a single line sensor camera 1 as the imaging means, a plurality of a lighting device 2 (partially omitted in the drawings), a mirror 8, a rope diagnosis device 9, and a speed/position detecting device 4 as the speed/position detecting means.

The line sensor camera 1 is installed so that the scanning direction is orthogonal to the traveling direction of the elevator rope 5. Furthermore, the line sensor camera 1 is set to image while automatically changing the sampling frequency according to the traveling speed (position) of the elevator rope 5, based on the information of the speed/position detecting device 4.

The lighting device 2 lights the portion being imaged by the line sensor camera 1 in the traveling direction of the elevator rope 5.

The mirror 8 reflects the surface on the opposite side (hereinafter, back surface) of the surface facing the line sensor camera 1, and is disposed so as to be able to image the back surface using the line sensor camera 1. Furthermore, the mirror 8 is installed so that the elevator rope 5 directly imaged by the line sensor camera 1 and the mirror image (hereinafter, elevator rope mirror image) 5' of the elevator rope 5 reflected by the mirror 8 do not overlap in the image imaged by the line sensor camera 1. Additionally, the mirror 8 is disposed so as match the position in the traveling direction of the elevator rope 5 imaged by the line sensor camera 1, that is, to match the position in the traveling direction of the imaging line 11*c* directly imaged by the line sensor camera 1 and the imaging line 11*d* imaging the elevator rope mirror image 5'.

By installing the mirror 8 as such, the entire circumference in the circumferential direction of the elevator rope 5 is imaged by a single line sensor camera 1.

Note that the mirror 8 can reflect the elevator rope 5 so as to be able to image a portion that cannot be directly imaged by the line sensor camera 1 of the elevator rope 5 using the line sensor camera 1; the configuration thereof does not matter.

The line sensor camera 1, lighting device 2, and mirror 8 are installed, for example, around the hoisting machine of the elevator rope 5.

The rope diagnosis device 9 inspects the state of elevator rope 5 by image processing the image data in which the elevator rope 5 was imaged by the line sensor camera 1, and is provided with an image recording part 9*a* as the image recording means, an image creating part 9*b* as the image creating means, and an image processing part 9*c* as the image processing means.

The image recording part 9*a* inputs image data from the line sensor camera 1 and records this in association with the position information acquired from the speed/position detecting device 4.

The image creating part 9*b* creates an entire circumferential image 6 (see FIG. 3(*a*)) for each elevator rope 5 based on image data acquired from the line sensor camera 1. Here, in the present embodiment, the portion in which the elevator rope mirror image 5' was imaged among the images imaged by the line sensor camera 1 must correct the image unlike the portion in which the elevator rope 5 was directly imaged. Thus, in the image for each rope, the image creating part 9*b* creates an entire circumferential image 6 of the elevator rope 5 by correcting the portion in which the elevator rope mirror image 5' is imaged.

Figure 5:
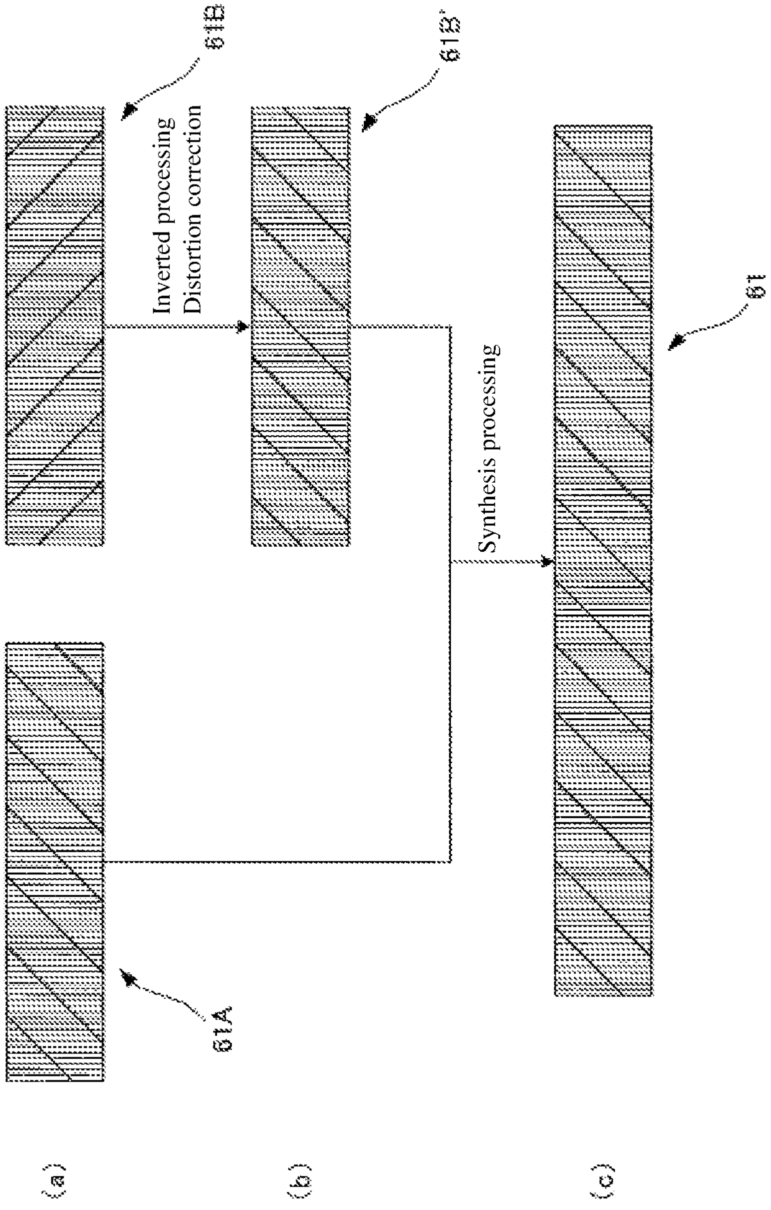
FIG. 5 is an explanatory view illustrating the processing according to the image creating part illustrated in FIG. 4.

More specifically, as illustrated in FIG. 5(*a*), among the images 61A, 61B imaged by the line sensor camera 1, distortion correction for correcting distortion in the image is carried out using an inversion process and the mirror 8 for the elevator rope mirror image 61B, which is the portion in which the elevator rope mirror image 5' was imaged, the inverted image 61B' is created as illustrated in FIG. 5(*b*), a synthesis processing is carried out between the elevator rope image 61A, which is the portion in which the elevator rope 5 was directly imaged by the line sensor camera 1, and the inverted image 61B', and a synthesized image 61 is created as illustrated in FIG. 5(*c*). The entire circumferential image 6 is created as illustrated in FIG. 3(*a*) via such processing.

The image processing part 9*c* analyzes the entire circumferential image 6, and extracts wire breakage, strand breakage, and the like.

The speed/position detecting device 4 is the same as that described in embodiment 1, and a detailed description thereof will be omitted here.

Next, the flow of the rope diagnosis will be described according the rope diagnosis device 9 of the present embodiment using FIG. 6.

Figure 6:
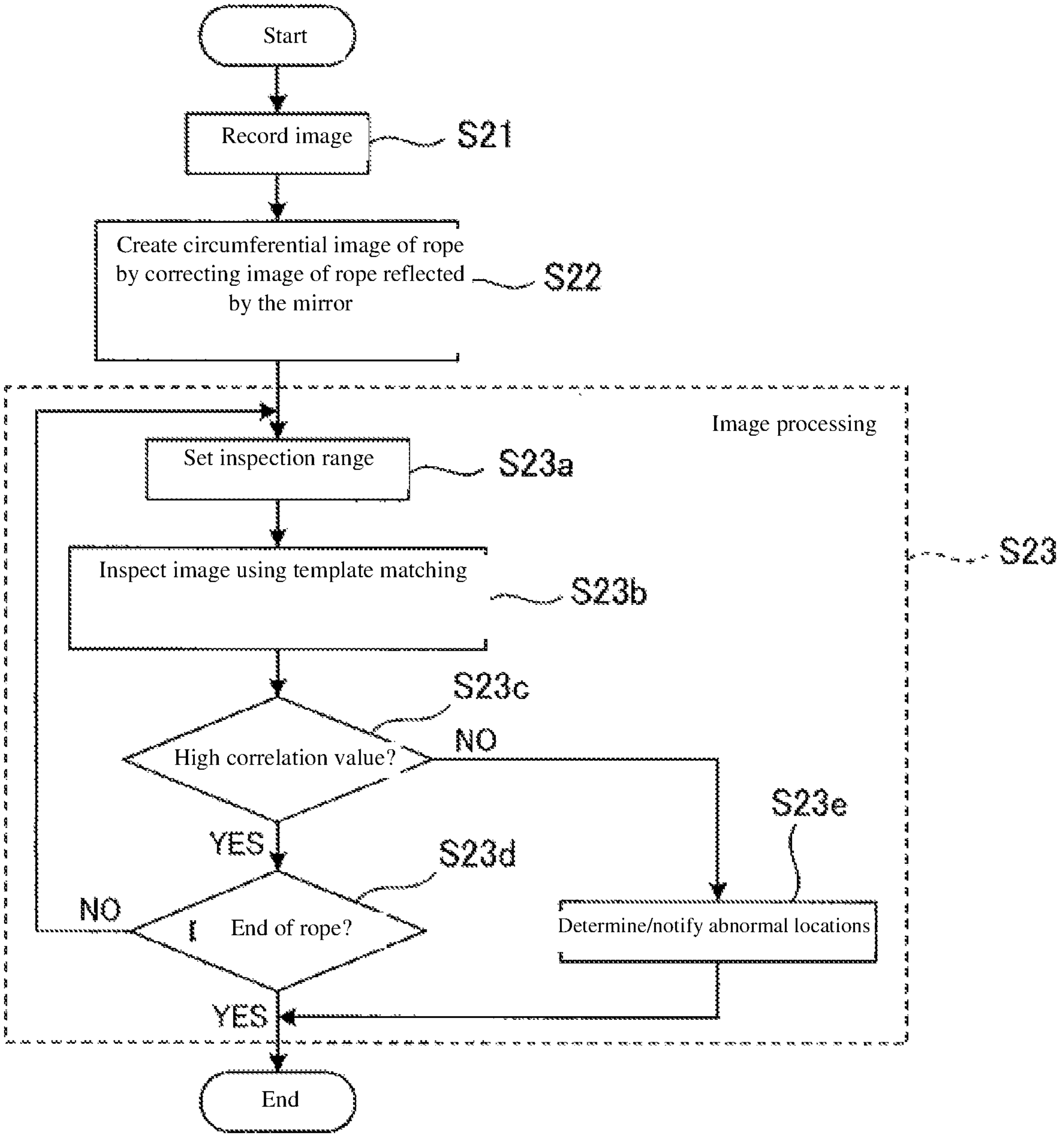
FIG. 6 is a flowchart illustrating the flow of the rope diagnosis processing according to the rope diagnosis device illustrated in FIG. 4.

As shown in FIG. 6. in the rope diagnosis device 9, first, the image of the elevator rope 5 imaged by the line sensor camera 1 is recorded using the image recording part 9*a* in association with the position information acquired from the speed/position detecting device 4 (step S21). Then, the entire circumferential image 6 is created using the image creating part 9*b* by correcting the image portion of the elevator rope 5 reflected by minor 8 from among the image data acquired by the line sensor camera 1 as described above (step S22).

Thereafter, image processing of the entire circumferential image 6 is carried out for the elevator rope 5 using the image processing part 9*c* (step S23).

Specifically, first, as illustrated in FIG. 3(*a*), the inspection range 6*a* for the entire circumferential image 6 is set (step S23*a*). The inspection range 6*a* is set as the range corresponding to the normal pattern template 7 created by acquiring the image of the normal elevator rope 5 in advance, as illustrated in FIG. 3(*b*).

Following step S23*a,* image inspection is carried out using template matching for comparing the image within the inspection range 6*a* and the normal pattern template 7 (step S23*b*).

Subsequently, it is determined whether a correlation value between the image within the inspection range 6*a* and the normal pattern template 7 is higher than a preset threshold value (step S23*c*); when the correlation value is higher than the threshold value (YES), the range is determined to be not abnormal (OK), and transitions to step S23*d*. Meanwhile, in step S23*c,* when the correlation value is lower than the threshold value (NO), since it is different than the normal pattern, it is determined that there is a potential for wire breakage or strand breakage (NG), and transitions to step S23*e*.

In step S23*d,* it is determined whether inspection has been performed to the end of the elevator rope 5, and if the inspection has not been performed to the end of the elevator rope 5 (NO), it returns to step S23*a,* but if the inspection has been performed to the end of the elevator rope 5 (YES), the diagnosis processing of the elevator rope 5 is completed.

Furthermore, in step S23*e,* it is determined that there is an abnormal location, the existence of the abnormal location and its position are notified, and the diagnosis processing is completed.

According to the elevator monitoring device according to the present embodiment configured as such, in addition to the effects of the invention according to embodiment 1, and because the entire circumferential of the elevator rope 5 can be imaged by a single line sensor camera 1, it is not necessary to synchronize a plurality of a line sensor camera, so it is possible to simplify the device configuration and to facilitate adjustment related to installation.

Note that in the present embodiment, an example using the mirror 8 described above is illustrated in FIG. 4, but instead of the mirror 8, for example, a plurality of a mirror may be disposed, a concave minor may be used, or the like, and various modifications are possible without departing from the purpose of the present invention.

INDUSTRIAL APPLICABILITY

The present invention can be applied to an elevator rope monitoring device that monitors an elevator rope without contact using a camera.

REFERENCE SIGNS LIST

1, 1*a,* 1*b* Line sensor camera
2, 2*a,* 2*b* Lighting device
3 Rope diagnosis device
3*a* Image recording part
3*b* Image creating part
3*c* Image processing part
4 Speed/position detecting device
5 Elevator rope
5' Elevator rope minor image
6 Entire circumferential image
6*a* Inspection range
7 Normal pattern template
8 Minor
9 Rope diagnosis device
9*a* Image recording part
9*b* Image creating part
9*c* Image processing part
11*a* to 11*d* Imaging line
61A Elevator rope image
61B Elevator rope mirror image
61B' Inverted image
61 Synthesized image

The invention claimed is:

1. An elevator rope monitoring device, comprising:
imaging means for imaging the entire circumference of the traveling elevator rope;
speed/position detecting means for detecting the traveling speed and traveling position of the elevator rope;
image recording means for inputting the image acquired by the imaging means in association with the traveling position of the elevator rope detected by the speed/position detecting means;
image creating means for creating an entire circumferential image of the elevator rope from the image; and image processing means for detecting an abnormality in the elevator rope by analyzing the entire circumferential image;

wherein the imaging means is configured to image while automatically changing a sampling frequency of the imaging means based on the traveling speed or the traveling position of the elevator rope obtained from the speed/position detecting means.

2. The elevator rope monitoring device according to claim 1, wherein the imaging means is a plurality of line sensor cameras;

the plurality of line sensor cameras are all synchronized with each other, and mutually image the entire circumference of the elevator rope by imaging different positions in the circumferential direction of the elevator rope; and the image creating means creates an entire circumferential image from the image imaged by all the line sensor cameras.

3. The elevator rope monitoring device according to claim 1, comprising:

a mirror that reflects the elevator rope; wherein the imaging means is a single line sensor camera;

the line sensor camera images the entire circumference of the elevator rope by simultaneously imaging the elevator rope and the mirror image of the elevator rope reflected by the mirror; and the image creating means corrects an image portion of the mirror image of the elevator rope imaged by the line sensor camera, and creates the entire circumferential image by synthesizing the corrected image of the mirror image of the elevator rope and the image of the elevator rope.

4. An elevator rope monitoring method, comprising the steps of:

detecting the traveling speed and traveling position of an elevator rope using a speed/position detecting means, while imaging the inter circumference of the traveling elevator rope using an imaging means;

inputting an image acquired by the imaging means using an image recording means in association with the traveling position of the elevator rope detected by the speed/position detecting means;

creating an entire circumferential image of the elevator rope from the image using an image creating means;

detecting an abnormality in the elevator rope by analyzing the entire circumferential image using an image processing means;

wherein the imaging means is configured to image while automatically changing a sampling frequency of the imaging means based on the traveling speed or the traveling position of the elevator rope obtained from the speed/position detecting means.

5. The elevator rope monitoring method according to claim 4, wherein the imaging means is a plurality of a line sensor camera;

the plurality of line sensor cameras are all synchronized with each other, and mutually image the entire circumference of the elevator rope by imaging different positions in the circumferential direction of the elevator rope; and the image creating means creates an entire circumferential image from the image imaged by all the line sensor cameras.

6. The elevator rope monitoring method according to claim 4, wherein the imaging means is a single line sensor camera;

a mirror is provided for reflecting the elevator rope;

the line sensor camera images the entire circumference of the elevator rope by simultaneously imaging the elevator rope and the mirror image of the elevator rope reflected by the mirror; and the image creating means corrects an image portion of the mirror image of the elevator rope imaged by the line sensor camera, and creates the entire circumferential image by synthesizing the corrected image of the mirror image of the elevator rope and the image of the elevator rope.

* * * * *